United States Patent
Barbero

(10) Patent No.: US 8,187,546 B2
(45) Date of Patent: May 29, 2012

(54) METHOD OF OPERATING A HIGH PRESSURE ETHYLENE POLYMERISATION UNIT

(75) Inventor: Bertrand Barbero, Le Havre (FR)

(73) Assignee: Total Petrochemicals France, Paris la Defense Cedex (FR)

( * ) Notice: Subject to any disclaimer, the term of this patent is extended or adjusted under 35 U.S.C. 154(b) by 96 days.

(21) Appl. No.: 12/663,392

(22) PCT Filed: Jun. 3, 2008

(86) PCT No.: PCT/EP2008/056846
§ 371 (c)(1),
(2), (4) Date: Jun. 3, 2010

(87) PCT Pub. No.: WO2008/148758
PCT Pub. Date: Dec. 11, 2008

(65) Prior Publication Data
US 2010/0261855 A1    Oct. 14, 2010

(30) Foreign Application Priority Data

Jun. 6, 2007  (EP) .................................... 07290711

(51) Int. Cl.
*B01J 19/00*   (2006.01)
*C08F 2/00*    (2006.01)
*C08F 210/00*  (2006.01)
*C08F 110/02*  (2006.01)

(52) U.S. Cl. ........... 422/131; 526/64; 526/348; 526/352

(58) Field of Classification Search .................. 422/131; 526/64, 348, 352
See application file for complete search history.

(56) References Cited

U.S. PATENT DOCUMENTS

| 4,008,049 A | 2/1977 | Clemmer et al. |
| 5,450,744 A | 9/1995 | Martyn |
| 8,008,931 B2 | 8/2011 | Parvinen et al. |
| 2006/0045823 A1 * | 3/2006 | Shaw et al. .................. 422/139 |

FOREIGN PATENT DOCUMENTS

| DE | 4108460 A1 | 9/1992 |
| JP | 63015317 A | 1/1988 |

* cited by examiner

Primary Examiner — William Cheung

(57) ABSTRACT

The invention relates to a method of operating a high pressure ethylene polymerization unit comprising a tubular reactor, the method characterized in that the electrical conductivity of the aqueous cooling medium is monitored in at least one location. Furthermore, the invention also covers a high pressure ethylene polymerization unit comprising a tubular reactor, the unit characterized in that one or more cooling circuits comprise an electrical conductivity meter. The use of such a polymerization unit is also disclosed.

12 Claims, 2 Drawing Sheets

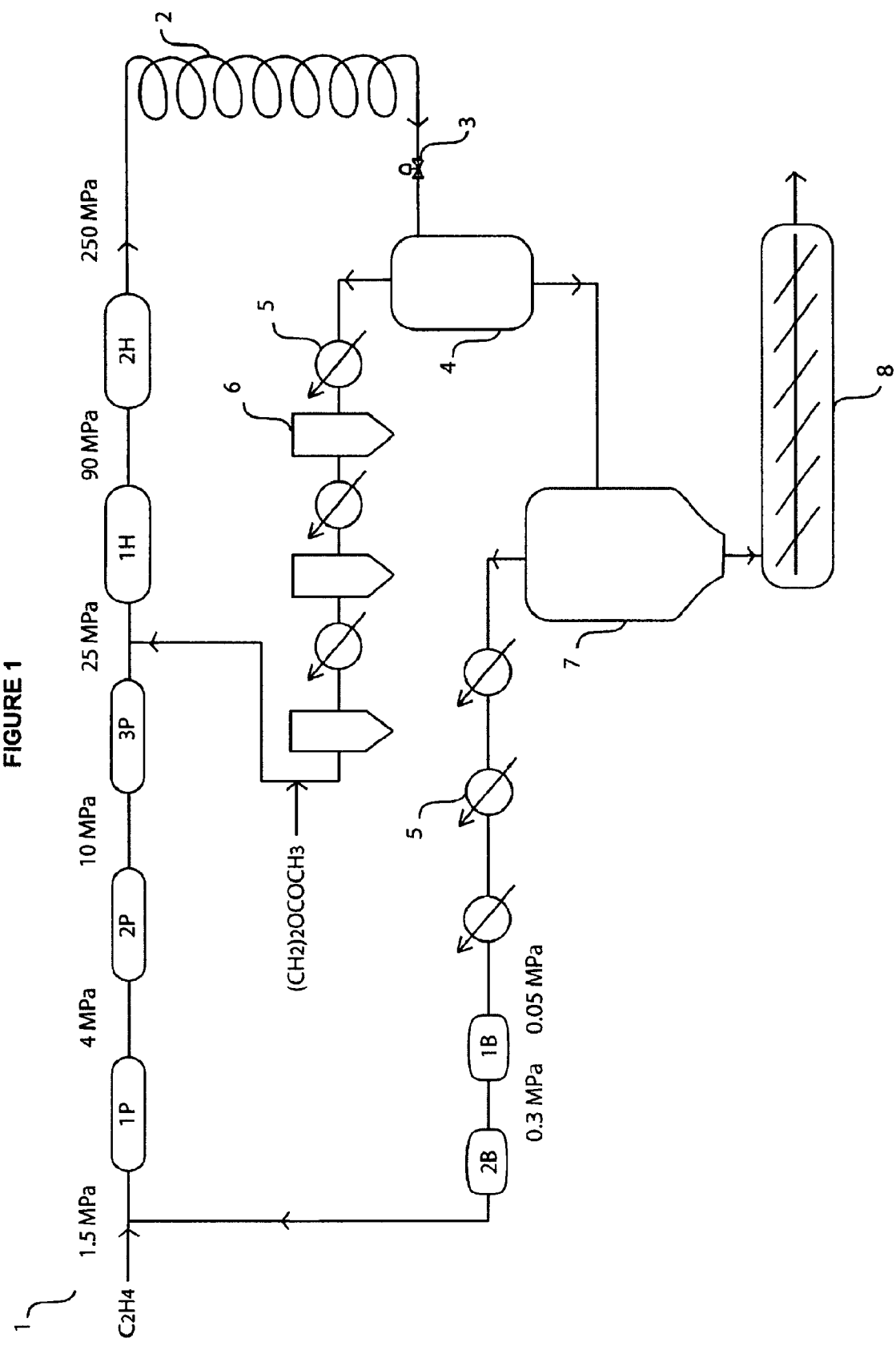

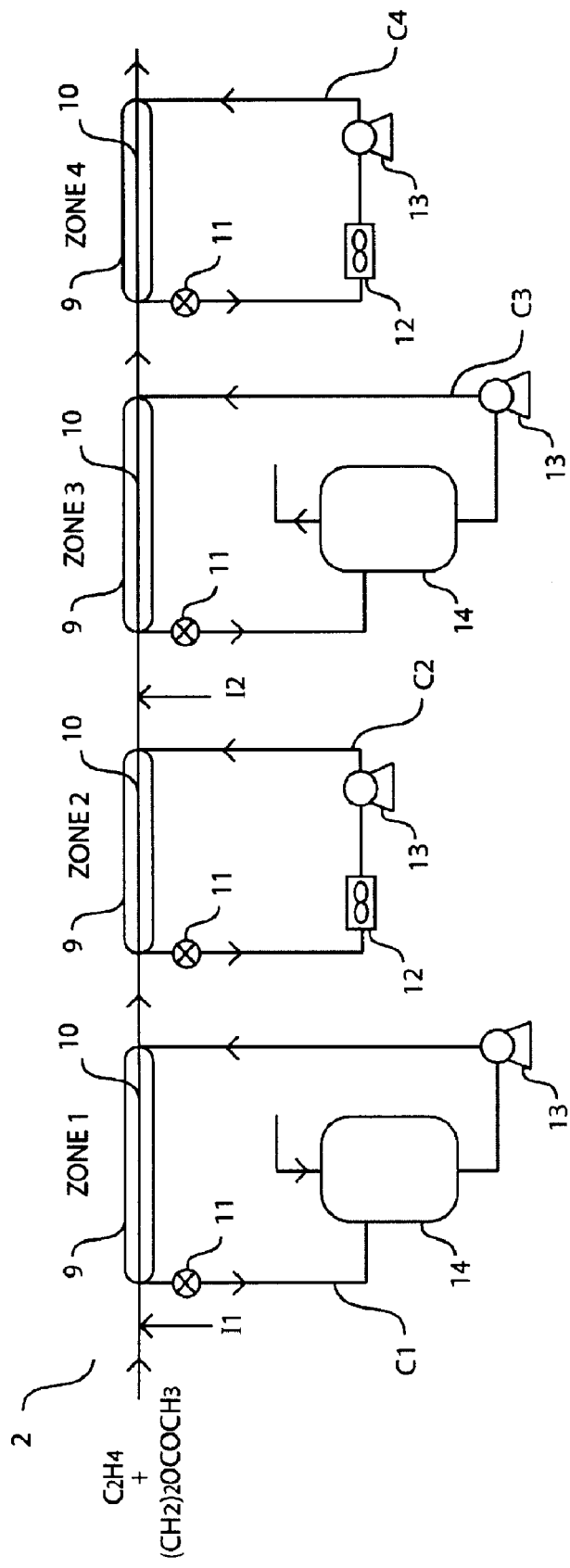

METHOD OF OPERATING A HIGH PRESSURE ETHYLENE POLYMERISATION UNIT

CROSS-REFERENCE TO RELATED APPLICATIONS

This application claims the benefit of PCT/EP2008/056846, filed Jun. 3, 2008, which claims priority from EP 07290711.6, filed Jun. 6, 2007.

FIELD OF THE INVENTION

The invention relates to a method of operating a high pressure ethylene polymerisation unit.

BACKGROUND OF THE INVENTION

Low density polyethylene (LDPE) having a high degree of long and short chain branching is generally produced in high pressure ethylene polymerisation units. Due to the long chain branching, LDPE exhibits low crystallinity and, when molten, a lower tensile strength and higher ductility than other known polyethylenes. These unique and desirable flow properties allow LDPE to be used for plastic film applications such as plastic bags and film wrap.

Copolymerisation of ethylene with vinyl acetate monomer (VAM) provides a copolymer known as ethylene-vinyl acetate (EVA). This polymer approaches the softness and flexibility of elastomeric materials, yet can be processed like other thermoplastics. The material generally has good barrier properties, good stress-crack resistance and high clarity and gloss. It also has high resistance to UV radiation. Furthermore, it has good heat sealing properties and can be used as a hot-melt adhesive. EVA has little or no odor and is competitive with rubber and vinyl products in many electrical applications. As it is virtually inert in the body, it is also used in biomedical engineering, for example in drug delivery applications. EVA can also be processed into a foam, which is used, for example, in the padding of sports equipment.

The high pressure ethylene polymerisation unit comprises a reactor wherein the polymerisation takes place under a pressure of from 50 to 300 MPa and at temperatures of from 100 to 400° C. It is a radical reaction, which can be triggered with initiators such as oxygen and peroxides. The reactor is either an autoclave reactor or a tubular reactor. Polymerisations carried out in an autoclave are adiabatic and hence no temperature control is required. However, in tubular reactors, care must be taken in order to control the reaction temperature or else thermal runaway may occur due to the exothermic nature of the reaction. To this end tubular reactors are made up of a plurality of interconnected double tubes. The inner central tube is where the reaction takes place and the outer, enveloping tube, also known as the cooling jacket, is where the cooling medium flows, regulating the temperature within the inner tube. The cooling jacket forms part of a larger cooling circuit, wherein the cooling medium can be cooled down again and sent back to the cooling jacket.

Temperature control increases productivity by keeping the reaction temperature under the decomposition limit. Usually, the cooling medium is water, in particular, demineralised water. The tubes are made of a special steel alloy designed to avoid violent ruptures resulting from the fatigue under the high pressures. Rather than rupturing, the tubes develop one or more small fissures. When these occur, the fissures steadily grow, creating a minor leakage of reaction medium into the cooling jacket. As the fissures expand, more and more polymer and monomer build up in the cooling jacket, causing a blockage in the circulation of the cooling water. Eventually the polymerisation temperature can no longer be efficiently controlled, which increases the risk of thermal runaway of the reaction. Once the leak is finally detected, the whole unit must be shut down in order to replace or repair not only the leaking reactor tube, but also the blocked cooling jacket. This is a heavy financial burden, not only in terms of equipment cost, but also in terms of lost production time. This problem can occur in any double tube within a high pressure ethylene polymerisation unit, whether in the tubular reactor or, for example, in the recycle systems of unreacted monomer. The higher the pressure within the tube, the higher the risk of a leak occurring.

Until now, the only available solution to the problem of detecting leaks in an ethylene polymerisation unit comprising a tubular reactor was to detect the presence of ethylene in the cooling water using a catalytic gas detector. However, these detectors cannot be installed online. Instead, the cooling water must be continuously sampled and analysed, which is not only an unnecessary waste, but also a complex process. In particular, during start-up of the polymerisation process, the cooling water in the first reactor zone is heated with hot water or steam, but the catalytic gas detector cannot withstand these conditions and is often damaged.

The tubular reactor may be divided into independent reaction zones, each with an independent cooling circuit. However, sampling cooling water from each cooling circuit and transferring it to each of the circuit's own independent condenser and gas detector is neither efficient, nor cost effective. Instead, sampling is usually combined through a common tube leading to a single condenser and detector. Unfortunately, it is then impossible to identify which reactor tube has incurred the leak, if ethylene is detected. Furthermore, the different pressures in each reactor zone cause preferential pathways in the cooling circuits. Even by carefully regulating the pressure valves, it is almost impossible to have a continuous simultaneous passage of gas from all the reactor zones to the detector.

It is thus an aim of the invention to improve the method of operating a high pressure ethylene polymerisation unit comprising a tubular reactor.

It is another aim of the invention to locate leaks in a high pressure ethylene polymerisation unit when copolymerising with a comonomer.

In addition, it is an aim of the invention to reduce sampling of cooling medium for detecting leaks in high pressure ethylene polymerisation units.

It is also an aim of the invention to reduce blockages in the cooling circuits comprised within high pressure ethylene polymerisation units.

It is yet another aim of the invention to reduce reactor downtime in case of a leak in high pressure ethylene polymerisation units.

It is a further aim of the invention to improve the detection of leaks in high pressure ethylene-vinyl acetate copolymerisation units.

SUMMARY OF THE INVENTION

The invention is directed towards a method of operating a high pressure ethylene polymerisation unit comprising a tubular reactor, the method characterised in that the electrical conductivity of the aqueous cooling medium is monitored in at least one location.

Furthermore, the invention is also directed to a high pressure ethylene polymerisation unit comprising a tubular reactor, the unit characterised in that one or more cooling circuits comprise an electrical conductivity meter. The invention also covers the use of such a unit.

BRIEF DESCRIPTION OF THE DRAWINGS

FIG. 1 represents a simplified example of a high pressure ethylene-vinyl acetate copolymerisation unit.

FIG. 2 represents a simplified example of a high pressure tubular ethylene polymerisation reactor and its cooling circuits.

DETAILED DESCRIPTION OF THE INVENTION

The person skilled in the art will appreciate that the invention can be applied to detecting leaks in any high pressure ethylene polymerisation unit comprising a tubular reactor made up of a plurality of interconnected double tubes. The polymerisation process is usually carried out under a pressure of at least 50, particularly of at least 100, 150, 200 or 250 MPa. The unit may further comprise a medium pressure recycle for recycling unreacted reactants also comprising a plurality of interconnected double tubes, wherein the contents to be recycled are under a pressure of at least 20 MPa, particularly of at least 25, 50, 100, 150, 200 or 250 MPa. In general, the higher the pressure in any section of the unit, the more useful the method of the invention will be, since the risk of a leakage increases with increasing pressure.

The double tubes, which are monitored for leakages, have a central tube and an outer enveloping tube. The medium to be treated, .e.g. to be polymerised or recycled, flows through the central tube and the heat transfer agent or cooling medium flows through the outer tube i.e. in the cooling jacket which envelops the central tube. Thus, tubular reactors comprise a cooling system.

Each cooling jacket forms part of one or more cooling circuits, through which the cooling medium circulates. There may be one or more cooling circuits in a high pressure polymerisation unit. Usually the cooling circuit comprises a cooler for cooling the cooling medium. The cooling circuit can possibly comprise a vaporiser, which is used for heating the medium in the cooling circuit, in particular, when starting up the reaction. The cooling circuit may optionally also comprise a pump for pumping the cooling medium back towards the tubes.

The cooling medium is an aqueous medium. Preferably, it comprises enough water to be electrically conductive. More preferably it comprises at least 10% by volume of water, even more preferably at least 20% by volume of water, even more preferably at least 30% by volume of water. Most preferably the cooling medium is water. In a preferred embodiment the water is demineralised water.

It is within the scope of the invention for the aqueous cooling medium to comprise other substances. For example, in one embodiment of the invention, the medium can comprise up to 70% by volume of an alcohol, preferably up to 50% by volume of an alcohol. For example, the alcohol can be a glycol such as ethylene or propylene glycol. The cooling medium must be able to act as a heat transfer agent by removing heat from the medium in the central tube, and thereby controlling the temperature therein.

At least one of the chemical substances, either flowing through the inner tube or formed therein, must be capable of changing the electrical conductivity of the aqueous cooling medium. Examples of chemical substances, which can change the electrical conductivity of an aqueous medium, include all electrolytes. Electrolytes are herein defined as chemical substances, which dissociate into ions when dissolved in water, thereby modifying the water's electrical conductivity.

If a leak occurs in one or more of the tubes, the chemical substance, which is capable of changing the electrical conductivity of the cooling medium, will seep into the medium circulating in the tube's cooling jacket, along with the other chemical substances present in the inner tubes. A conductivity meter installed in the cooling circuit which is constantly monitoring the conductivity of the medium, will signal a sudden change in its conductivity, making it is thus immediately apparent that one or more tubes have incurred a leak. According to the invention, one or more cooling circuits comprise an electrical conductivity meter. Preferably, each cooling circuit comprises an electrical conductivity meter.

The conductivity meter can be situated at any point in the cooling circuit. Preferably, it is positioned at a point in the cooling circuit where the circulating cooling medium is travelling away from the tubes' cooling jackets. In another embodiment of the invention, it is positioned at a point in the cooling circuit before the cooling medium enters the cooler.

The invention is particularly suitable for an ethylene copolymerisation reaction. In ethylene copolymerisations, at least one of the comonomers must be capable of changing the electrical conductivity of the aqueous cooling medium. The comonomer can be selected from one or more of:
- acrylic and alkacrylic compounds such as acrylic, haloacrylic, and methacrylic acids and esters;
- vinyl compounds such as vinyl esters and sulphonic esters;
- derivatives of unsaturated carboxylic acids such as maleic anhydride, dialkylmaleates and dialkylfumarates; and
- ionic vinyl compounds such as sodium vinyl sulphonate;

Preferably the comonomer is a vinyl ester. More preferably, the vinyl ester is vinyl acetate monomer (VAM). VAM can change the electrical conductivity of water, as it undergoes hydrolysis in water thereby forming an electrolyte, acetic acid. If a leak occurs, VAM enters the cooling circuit, hydrolyses, and the acetic acid triggers a sudden change in the electrical conductivity of the aqueous cooling medium monitored by the conductivity meter installed in the circuit.

The polymerisation reaction is started with an initiator, which can be selected from the non-exhaustive list of oxygen, peroxides (such as benzoyl peroxide, acetyl peroxide and alkylhydroperoxides), dioxides, peracetic acid, alkali metal and ammonium persulphates, perborates and percarbonates. The higher the concentration of initiator, the faster the reaction will proceed, but the lower the molecular weight of the resulting polymer will be. Optionally, more initiator can be added at a later stage in the reaction, for example, between two downstream reactor zones.

In another embodiment of the invention, the ethylene polymerisation unit also comprises a medium pressure recycle. Medium pressure recycles are used for example to purify unreacted monomers in order that they may be reused in the reaction. In general, the chemical species that are treated in medium pressure recycles are maintained under a high pressure of at least 20 MPa, preferably at least 25 MPa, and purified in a series of condensers and separators. The temperature of the chemical species must be controlled in order to avoid unwanted reactions in the recycle, hence the reason for using double tubes. In particular, the condensers, as well as the tubing connecting the condensers with the separators, can be made up of interconnected double tubes, each cooling jacket forming part of a cooling circuit, which according to the invention can comprise an electrical conductivity meter to monitor the cooling medium's conductivity in order to detect leaks in the tubes of the recycle system within the unit.

The invention is also directed towards a high pressure ethylene polymerisation unit comprising a tubular reactor. The unit has one or more cooling circuits comprising an electrical conductivity meter. Preferably, each cooling circuit comprises an electrical conductivity meter. Preferably, the electrical conductivity meter is positioned at a point in the cooling circuit where the circulating medium would travel away from the reactor when the circuit is in use. In another embodiment, it is positioned at a point in the cooling circuit before the medium enters the cooler or vaporiser when the circuit is in use. The unit may also comprise a medium pressure recycle.

The apparatus can be used to detect leaks that may occur in the reactor and/or in the medium pressure recycle. Preferably, the apparatus is used to detect leaks during polymerisation.

The figures illustrate the invention in relation to high pressure ethylene copolymerisations with VAM in a tubular reactor, wherein the cooling medium is cooling water.

FIG. 1 illustrates a simplified diagram of an ethylene high pressure polymerisation unit (1). Gaseous ethylene under a pressure of about 1.5 MPa is further pressurised in a series of compressors (1P, 2P, 3P, 1H, 2H) to a reaction pressure of 250 MPa. 1P, 2P and 3P are medium pressure compressors and 1H and 2H are hypercompressors. The ethylene and VAM, at this point in a supercritical state, are then fed to the tubular reactor (2) comprising a plurality of interconnected double tubes, wherein ethylene and VAM are copolymerised using an initiator such as a peroxide. Pressure in the reactor is controlled via a valve (3). After the reaction medium has travelled through the tubes, unreacted monomer is then separated from the crude polymer product in a separator (4), both still under pressure. The unreacted monomer is cooled in another series of condensers (5) and separators (6) forming the so-called medium pressure recycle. Since the pressures in the medium pressure recycle are still high (at least 20 MPa), the connecting tubes within the recycle system are also of the double tube type, for example, in the condensers (5). Each one of the double tubes' cooling jackets is part of a cooling circuit in which a conductivity meter is installed. The monomer is then recycled back into the ethylene monomer flow under a pressure of at least 20 MPa with preferably about 0.1 to 80 wt % of added comonomer VAM, the exact proportion depending on the desired properties and end use of the final polymer. Polyethylene product is further purified by degassing (7). The ethylene monomer obtained therefrom is recompressed and recycled back into the fresh ethylene monomer flow at 1.5 MPa. This is known as the low pressure recycle. The purified polyethylene product is extruded and pellitised (8).

FIG. 2 illustrates a simplified diagram of an example of a tubular reactor (2) in a high pressure ethylene polymerisation unit. In this example the reactor is divided into 4 zones each with an independent cooling circuit (C1, C2, C3, C4) comprising cooling jackets (9) which envelope the reactor tubes (10). Once the pressurised ethylene and VAM enter the reactor, an initiator (11) is injected prior to the first zone. After the second zone an additional amount of initiator (12) can be injected.

A conductivity meter (11) is installed online on each of the cooling circuits (C1, C2, C3, C4). Preferably, as shown in FIG. 2, the conductivity meter (11) is installed at a point in zones 2 and 4 before the water enters the cooler, which is preferably an air cooler (12). In zones 1 and 3, it is installed at a point before the water enters the vaporiser drum (14). Pump (13) pumps the water back towards the cooling jacket of the reactor tubes.

If a leak occurs in one of the reactor tubes (10) or in the tubes of the medium pressure recycle, ethylene, VAM and polymer product will begin to seep into the respective cooling jacket and cooling circuit. Immediately, VAM will react with the cooling water to form acetic acid in an equilibrium reaction. This will cause the online conductivity meter of the respective cooling circuit to measure a sharp increase in the electrical conductivity of the water.

The unit can then be immediately stopped and the offending tube replaced, before any further blockage of the cooling circuit can occur.

The method of operating a high pressure ethylene polymerisation unit is thereby improved. The detection of leaks in the double tubes present in the unit, is more efficient and reliable. Sampling of the cooling medium is no longer required, because the conductivity meter can measure conductivity online. The rapid detection of leaks also means that build-up of polymer product in the cooling circuit is almost entirely avoided. As a result, the shut down time of the reactor to replace equipment is drastically reduced.

EXAMPLE OF THE INVENTION

The following is an example of a high pressure ethylene-vinyl acetate copolymerisation process and how leaks can be detected in the polymerisation unit according to the method of the invention.

95 wt % ethylene and 5 wt % VAM under a pressure of 250 MPa are fed into a tubular reactor comprised within a high pressure polymerisation unit. 10 kg/h of peroxide is injected into the reactor for 24 ton/h of feed. Polymerisation takes place in four successive reactor zones, each having an independent cooling circuit comprising a cooling jacket that envelopes the reactor tubes. The cooling medium is demineralised water. A further injection of 10 kg/h peroxide is made after the second reactor zone. A conductivity meter is installed in the cooling circuit of each zone, at a point before the water enters the cooler or vaporiser.

A standard leak in a tubular reactor has an initial rate of leakage of about 20 kg/h. The demineralised water provided by the central water unit has an electrical conductivity of 2 to 3.3 µS/cm. When VAM enters the cooling circuit, about 50% of it is converted to acetic acid. In general it can be said that the demineralised water with 1 ppm of acetic acid has an electrical conductivity of about 4.2 µS/cm. At 3 ppm, the electrical conductivity is about 7.4 µS/cm and at 10 ppm, about 15 µS/cm. A standard leak translates as an instantaneous appearance of acetic acid in the cooling water at a concentration of about 5.5 ppm. The electrical conductivity of the water thus increases immediately from about 2 µS/cm to about 10 µS/cm, which is measured online with the conductivity meter. The presence of a leak is thereby instantly evident. The unit can be stopped and the damaged reactor tube replaced before further problems can occur.

The invention claimed is:

1. A method of operating an ethylene polymerization unit comprising:
    providing a polymerization unit comprising a tubular reactor;
    providing ethylene monomer to the polymerization unit;
    contacting the ethylene monomer with a catalyst system within the polymerization unit to form polyethylene;
    withdrawing the polyethylene from the polymerization unit; and
    monitoring electrical conductivity of an aqueous cooling medium in at least one location.

2. The method of claim 1, wherein the electrical conductivity of the aqueous cooling medium is monitored separately in each cooling circuit.

3. The method of claim 1, wherein at least one chemical substance in the polymerization unit is capable of changing the electrical conductivity of the aqueous cooling medium.

4. The method of claim 3, wherein at least one of the chemical substances capable of changing the electrical conductivity of the aqueous cooling medium is a comonomer.

5. The method of claim 4, wherein the comonomer is selected from acrylic and alkacrylic compounds, vinyl compounds, derivatives of unsaturated carboxylic acids and ionic vinyl compounds.

6. The method of claim 4, wherein comonomer is a vinyl ester.

7. The method of claim 1, wherein the aqueous cooling medium is water.

8. The method of claim 1, wherein the polymerization unit further comprises a recycle stream comprising unreacted ethylene.

9. An ethylene polymerization unit comprising:
a tubular reactor, wherein the polymerization unit is adapted to operate at a pressure of at least 50 MPa for the polymerization of ethylene monomer; and
one or more cooling circuits comprising an electrical conductivity meter to monitor the electrical conductivity of a cooling medium within at least one cooling circuit.

10. The polymerization unit of claim 9, wherein each cooling circuit comprises an electrical conductivity meter.

11. The polymerization unit of claim 9, wherein the conductivity meter is positioned before a cooler within the cooling circuit.

12. The polymerization unit of claim 9, further comprising a medium pressure recycle capable of operating at a pressure of at least 20 MPa.

* * * * *